United States Patent
Kato et al.

(10) Patent No.: US 6,170,079 B1
(45) Date of Patent: Jan. 2, 2001

(54) POWER SUPPLY CIRCUIT DIAGRAM DESIGN SYSTEM

(75) Inventors: Tsuyoshi Kato; Takehiko Shimizu; Takashi Saito; Shuichiro Yamada, all of Oyama (JP)

(73) Assignee: Fujitsu Limited, Kawasaki (JP)

( * ) Notice: Under 35 U.S.C. 154(b), the term of this patent shall be extended for 0 days.

(21) Appl. No.: 09/021,371

(22) Filed: Feb. 10, 1998

(30) Foreign Application Priority Data

Jul. 24, 1997 (JP) .................................................... 9-198304

(51) Int. Cl.$^7$ .................................................... G06F 17/50
(52) U.S. Cl. .................. 716/10; 716/11; 716/15; 326/101
(58) Field of Search .................. 395/500.01–500.19; 716/10

(56) References Cited

U.S. PATENT DOCUMENTS

| | | | |
|---|---|---|---|
| 4,947,229 | * 8/1990 | Tanaka et al. | 357/45 |
| 4,964,057 | * 10/1990 | Yabe | 364/491 |
| 5,187,864 | * 2/1993 | Brasen et al. | 29/846 |
| 5,212,653 | * 5/1993 | Tanaka et al. | 364/491 |
| 5,349,542 | * 9/1994 | Brasen et al. | 364/578 |
| 5,391,900 | * 2/1995 | Onodera et al. | 257/207 |
| 5,422,523 | * 6/1995 | Roberts et al. | 326/68 |
| 5,537,328 | * 7/1996 | Ito | 364/489 |
| 5,550,750 | * 8/1996 | Wolff | 364/491 |
| 5,610,832 | * 3/1997 | Wikle et al. | 364/491 |
| 5,648,910 | * 7/1997 | Ito | 364/490 |
| 5,745,371 | * 4/1998 | Shouen | 364/489 |
| 5,784,291 | * 7/1998 | Chen et al. | 364/491 |
| 5,787,268 | * 7/1998 | Sugiyama et al. | 395/500 |
| 5,824,570 | * 10/1998 | Aoki et al. | 438/128 |
| 5,869,852 | * 2/1999 | Kinoshita | 257/207 |
| 5,987,086 | * 11/1999 | Raman et al. | 375/500.02 |
| 6,006,024 | * 11/1999 | Guruswamy et al. | 395/500.13 |

FOREIGN PATENT DOCUMENTS 3-71267   3/1991   (JP) .

OTHER PUBLICATIONS

Brasen, Daniel, Floorplanning with Power Routing, Proceedings of Euro ASIC '92, pp. 165–168, Jun. 1992.*

Ng et al., A Hierarchical Floor–Planning, Placement, and Routing Tool for Sea–of–Gates Designs, Proceedings of the IEEE Custom Integrated Circuits Conference, pp. 3.3.1–3.3.4, May 1989.*

Intusoft, Power Supply Designer, [Online]. http://www.intusoft.com, Jan. 1999.*

\* cited by examiner

*Primary Examiner*—Paul R. Lintz
*Assistant Examiner*—A. M. Thompson
(74) *Attorney, Agent, or Firm*—Staas & Halsey LLP

(57) ABSTRACT

A data library, a CPU and a memory store a design aid program which designs power supply circuit diagrams based on the data library in accordance with given conditions for a power supply circuit. Therefore, design errors associated with an increased design scale are prevented and the design time is shortened. The given conditions are taken as the respective vertical and horizontal intervals between power portions having first pins for connecting to a power supply and second pins for connecting to earth, and the number of rows and the number of steps of the power portions. Then, multiple available power portions are arranged according to the given conditions by a design aid program and the multiple arranged power portions are wired to a power supply symbol and an earth symbol, respectively.

19 Claims, 22 Drawing Sheets

| NAME | EXPLANATION | DISPLAYED SHAPE ON CIRCUIT DIAGRAM |
|---|---|---|
| POWER | VOLTAGE: +5v | +5V — |
| POWER PORTION | POWER SUPPLY PINS: 1<br>EARTH PINS: 1 | ⇐ POWER SOURCE PIN<br>⇐ EARTH PIN |
| EARTH (GROUND) | 0 V | ⏚<br>0V |
| NET (LINE) | WIRINGS | |

FIG. 8

```
                POWER SUPPLY CIRCUIT GENERATOR
                             a         b        c       d
140~ARRANGE MODE :    PWR-PORTION | PASS_CON | MIX | SEPARATE
    VERTICAL INTERVAL :  ①  △▽ (mm)
    HORIZONTAL INTERVAL : ②  △▽ (mm)
141~«PWR-PORTION» TOTAL : 121   UNUSED : 56
         ROW X STEP :  ③ △▽  X  ④ △▽
142~«PASS_CON»     CAPACITOR TOTAL : 70
         SPEC         ASSIGN CODE  NUMBER   ROW   X   STEP
                                    __△▽   __△▽  X  __△▽
      ⑤ {                          __△▽   __△▽  X  __△▽
                                    __△▽   __△▽  X  __△▽
                                    __△▽   __△▽  X  __△▽
         ⑥ VOLTAGE : +5V  : __    : __    : __
     143~(APPLY)                            (RESET)
```

IC COMPONENTS

POWER SUPPLY CIRCUIT DIAGRAM DESIGN SYSTEM

BACKGROUND OF THE INVENTION

1. Field of the Invention

The present invention relates to a design system for power supply circuit diagrams, and more particularly, to a design system for power supply circuit diagrams using CAD (Computer Aided Design) systems.

2. Description of the Related Art

In circuit design using CAD, in order to raise efficiency, IC components are categorized provisionally in advance, and recorded in a database. For example, a 14-pin IC component as shown in FIG. 24 is divided into five types, as illustrated in FIG. 25. Here, these five respective types are called "portions".

In FIG. 25, the numbers correspond to the 14 pins of the IC component in FIG. 24. Moreover, portion number (5) comprises a pin for connecting to a power supply and a pin for connecting to an earth, and it is called a "power portion" to differentiate it from the other general portions.

In designing a power supply circuit, a plurality of power portions for IC components contained in a device circuit are arranged such that they are connected to a power supply and an earth. In this power supply design process, hitherto, the designer has had to input the power portions and bypass capacitors (in the drawings, abbreviated to "Pass_Con",) contained in a power supply circuit, mechanically, one by one, and connect them to the power supply and earth.

However, power portions are required in a power supply circuit diagram at a ratio of one per component, and moreover, bypass capacitors must also be input. Therefore, as the number of components used in the design increases, the number of power portions and bypass capacitors to be input also increases. As a result, a significant amount of labour and time is required to create the power supply circuit diagram.

Under these circumstances, as a design increases in scale, the design time inevitably rises and the problem of simple design errors occurs.

SUMMARY OF THE INVENTION

Therefore, it is an object of the present invention to provide a power supply circuit design system wherein data is input, components are automatically arranged, and wiring connections are made automatically, thereby enabling design errors associated with increases in design scale to be prevented and allowing design time to be shortened.

The aforementioned object of the present invention is achieved by means of a power supply circuit diagram design system including a data library, a CPU, and a memory storing a design aid program implemented by the CPU, which designs power supply circuit diagrams on the basis of the data library in accordance with given conditions for a power supply circuit, wherein the given conditions are taken as the respective vertical and horizontal intervals between power portions having pins for connecting to a power supply and pins for connecting to an earth, and the number of rows and the number of steps of the power portions and a plurality of power portions are arranged according to the given conditions by means of the design aid program, and the plurality of arranged power portions are each respectively wired to a power supply symbol and an earth symbol.

Moreover, in a further mode, the object of the present invention is achieved by means of a power supply circuit diagram design system comprising a data library, a CPU, and a memory storing a design aid program implemented by the CPU, which designs power supply circuit diagrams on the basis of the data library in accordance with given conditions for a power supply circuit, wherein the given conditions are taken as the vertical and horizontal intervals between bypass capacitors, and the number of bypass capacitors and the number of rows for each type of bypass capacitor. The number of bypass capacitors is arranged in the number of rows and a number of steps, derived from the number of bypass capacitors and the number of rows, by means of the design aid program, and each bypass capacitor is wired respectively to a power supply symbol and an earth symbol.

Moreover, in a further mode, the object of the present invention is achieved by means of a power supply circuit diagram design system comprising a data library, a CPU, and a memory storing a design aid program implemented by the CPU, which designs power supply circuit diagrams on the basis of the data library in accordance with given conditions for a power supply circuit, wherein the given conditions are taken as the respective vertical and horizontal intervals between components, where these components comprise power portions and bypass capacitors having pins for connecting to a power supply and pins for connecting to an earth, the number of rows and the number of steps of the components, and the number of each type of bypass capacitor and a plurality of power portions and bypass capacitors are arranged alternately according to the given conditions by means of the design aid program, and the plurality of arranged power portions and bypass capacitors are each respectively wired to a power supply symbol and an earth symbol.

In the foregoing, it is also possible for the given conditions to be taken as the vertical and horizontal intervals between bypass capacitors, and the number of bypass capacitors and the number of rows corresponding to each type of bypass capacitor, and for the number of bypass capacitors to be arranged in the number of rows and a number of steps derived from the number of bypass capacitors and the number of rows, each of these bypass capacitors being wired respectively to a power supply symbol and an earth symbol.

In the foregoing, the present invention may also be characterized in that the wiring to the power supply symbol and earth symbol is carried out with reference to the longest pins connecting to the power supply symbol and the earth symbol in the power portions or bypass capacitors arranged in the number of rows and number of steps according to the given conditions. Thereby, the shape of the circuit diagram can be established.

Furthermore, in the foregoing, the present invention may also be characterized in that, when the power supply symbol comprises a plurality of potential differences, wiring is carried out by giving priority to power portions or bypass capacitors connected to a power supply symbol of the same type, such that the wiring distance to the corresponding power supply symbol is made as short as possible. Thereby, the shape of the circuit diagram can be established.

Moreover, in the foregoing, the present invention is also characterized in that it comprises a display device for displaying the designed power supply circuit, and after the arranged number of rows and number of steps of the power portions and/or bypass capacitors has been determined, it is possible to move the circuit diagram about the screen of the display device, whilst maintaining the wiring connections to the power supply and earth.

BRIEF DESCRIPTION OF THE DRAWINGS

FIG. 8 is a diagram explaining a shape sample diagram used in the power supply circuit diagram confirmed and displayed in FIG. 7.

DESCRIPTION OF THE PREFERRED EMBODIMENTS

Figure 1:
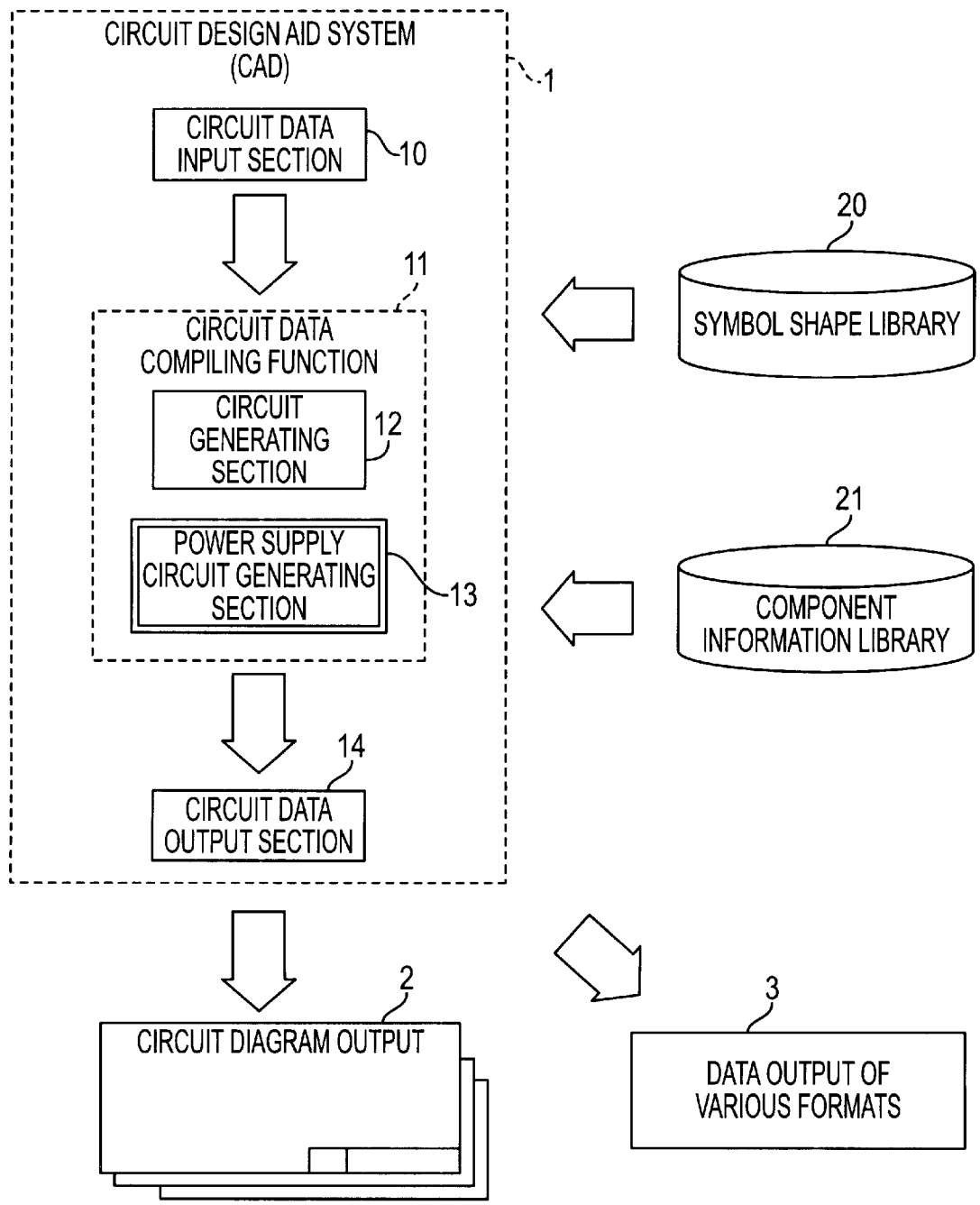
FIG. 1 is a schematic diagram of an example of a design system for power supply circuit diagram according to the present invention.

Below, a mode for implementing the present invention is described with reference to the drawings. In the drawings, elements which are the same or similar are labelled with the same reference number or reference symbol. FIG. 1 shows the overall composition of a design system for power supply circuit diagrams according to the present invention. In FIG. 1, a data library is stored in a memory in the form of a symbol shape library 20 and a component information library 21.

The symbol shape library 20 records and stores the shapes of components which form electronic circuits. In electronic circuits forming power supply circuits, the shapes of power portions, bypass capacitors, and other components, which form power supply circuits are recorded and stored. The component information library 21, on the other hand, records and stores the attributes of the corresponding components, namely, their input/output conditions, number of pins, etc. in the form of data.

The circuit design aid system 1 is constituted by a CAD (computer aided design) system based on an application program. The circuit design aid system 1 includes a circuit data input section 10, a circuit data compiling function 11, and a circuit data output section 14.

The circuit data compiling function 11 includes a circuit generating section 12 and a power supply circuit generating section 13. The present invention relates particularly to the power supply circuit generating section 13 in the circuit data compiling function 11. Power circuits are designed in accordance with the power supply circuit generating section 13 on the basis of the circuit data compiling function 11 in the circuit design aid system 1. The output therefrom is displayed as a circuit diagram output 2 on a display, which is omitted from the drawings, by command from the circuit data output section 14. Alternatively, it is recorded and output in the form of a data output of various formats, to a memory or other external device.

Figure 2:
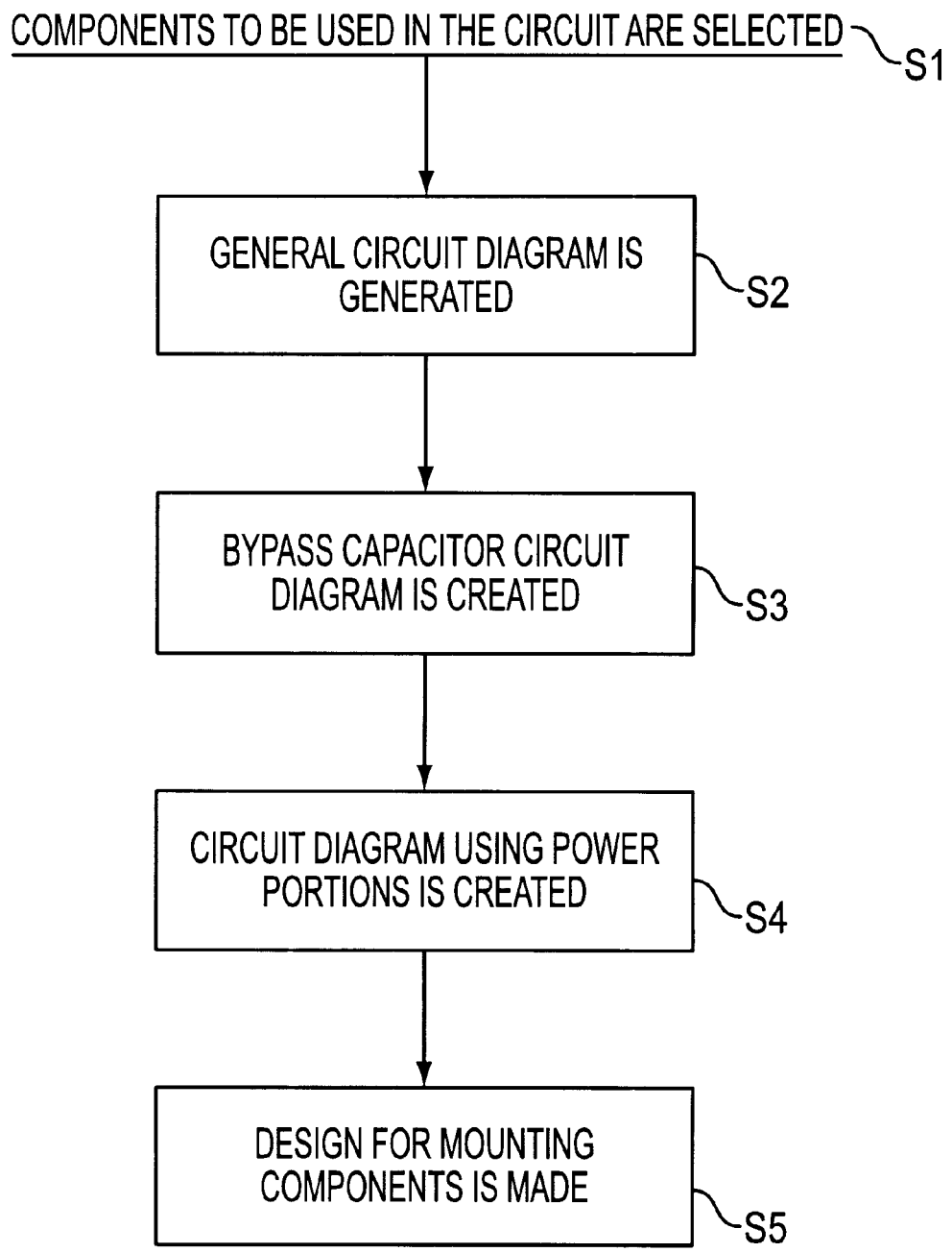
FIG. 2 is a flowchart relating to the circuit data compiling function 11 in the example of FIG. 1.

FIG. 2 is a functional flowchart relating to the circuit data compiling function 11 in the circuit design aid system 1. Firstly, the components to be used in the circuit are selected (step S1). When this selection (step S1) has been completed, a general circuit diagram is generated by the circuit data compiling function 11 (step S2). This general circuit diagram is generated manually by a designer, since each diagram varies depending on the function to be created, as illustrated in FIG. 3A.

The present invention is characterized in that, hereafter, the power supply circuit diagram generating section 13 is automated. A bypass capacitor circuit diagram is created (step S3) and a circuit diagram using power portions is created (step S4), whereupon the design for the actual packaging or mounting of components is performed (step S5).

Figure 3A:
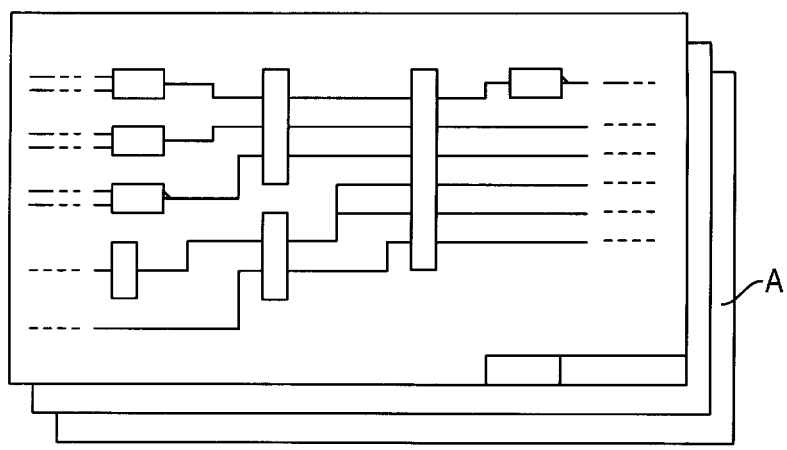
FIGS. 3A, 3B and 3c are diagrams of examples of designs for a bypass capacitor circuit diagram and a circuit diagram using power portions according to the present invention.
Figure 3B:
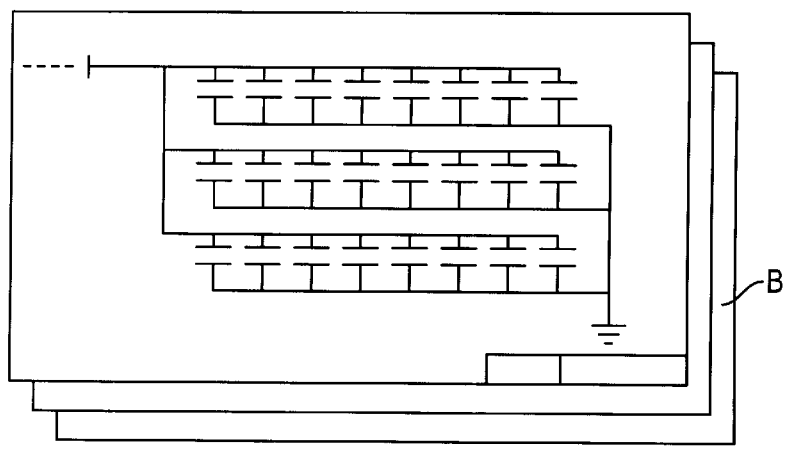
Figure 3C:
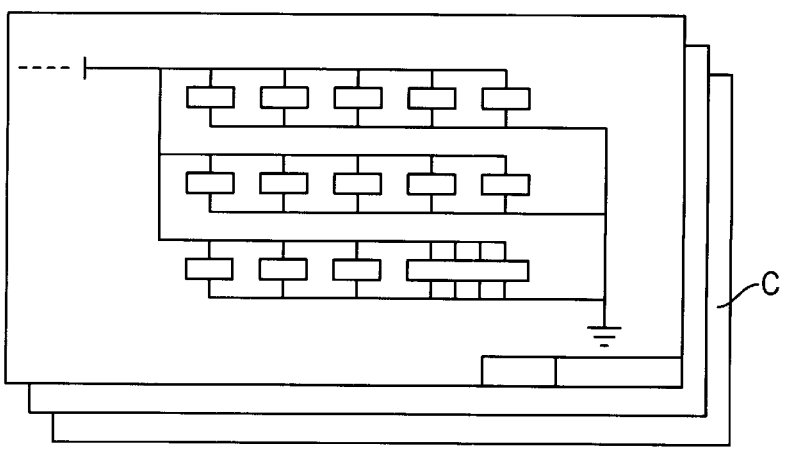

Here, with reference to FIGS. 3A to 3C, examples of designs for a bypass capacitor circuit diagram and a circuit diagram using power portions are shown respectively in FIG. 3B and FIG. 3C, and both diagrams show virtually the same configuration. Therefore, with regard to this point, the present invention enables a power supply circuit to be generated automatically.

Figure 4:
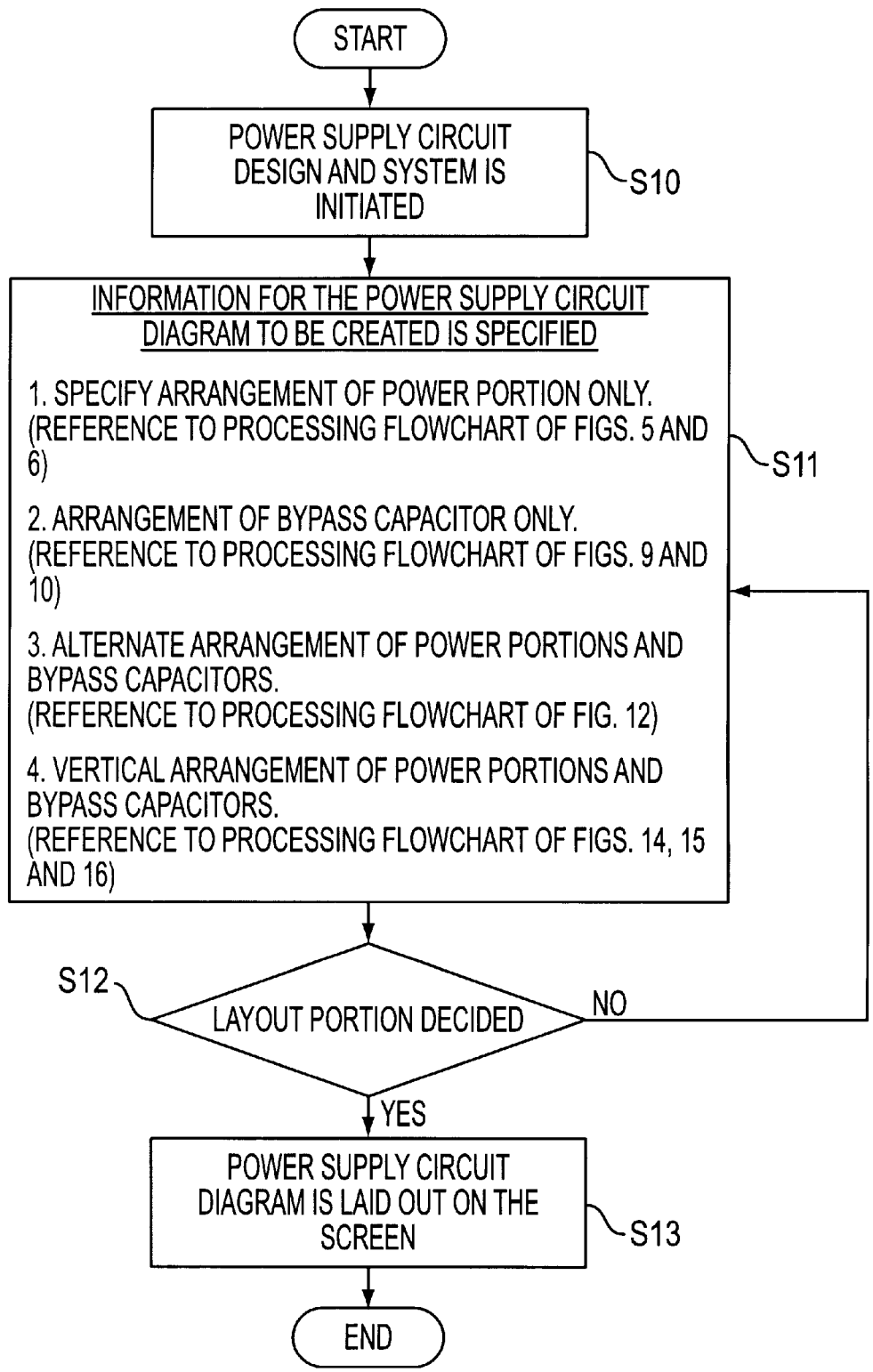
FIG. 4 is a processing flowchart in a power supply circuit diagram design system according to the present invention.

FIG. 4 shows an overview of a processing flowchart in a power supply circuit diagram design system according to the present invention.

Firstly, the power supply circuit design aid system is initiated (step S10). When this system has been initiated (step S10), information for the power supply circuit diagram to be created is specified (step S11). In the power supply circuit diagram to be created, it is possible to specify the arrangement of power portions only, the arrangement of bypass capacitors only, an alternate arrangement of power portions and bypass capacitors, or a vertical arrangement of power portions and bypass capacitors.

As shown respectively in FIG. 4, a case where the arrangement of power portions only is specified corresponds to the processing flowcharts in FIG. 5 and FIG. 6, which are described later, and similarly, a case where the arrangement of bypass capacitors only is specified corresponds to the processing flowcharts in FIG. 9 and FIG. 10, the case where an alternate arrangement of power portions and bypass capacitors is specified corresponds to the processing flowchart in FIG. 12, and a case where a vertical arrangement of power portions and bypass capacitors is specified corresponds to processing flowcharts in FIGS. 14, 15 and 16.

Returning to FIG. 4, when information for the power supply circuit diagram to be created has been indicated (step S11), it is determined whether or not the layout position has been decided (step S12). If the layout position has been decided, then a power supply circuit diagram is laid out on the screen (step S13). With this, the processing of the power supply circuit design aid system according to the present invention is completed.

Figure 5:
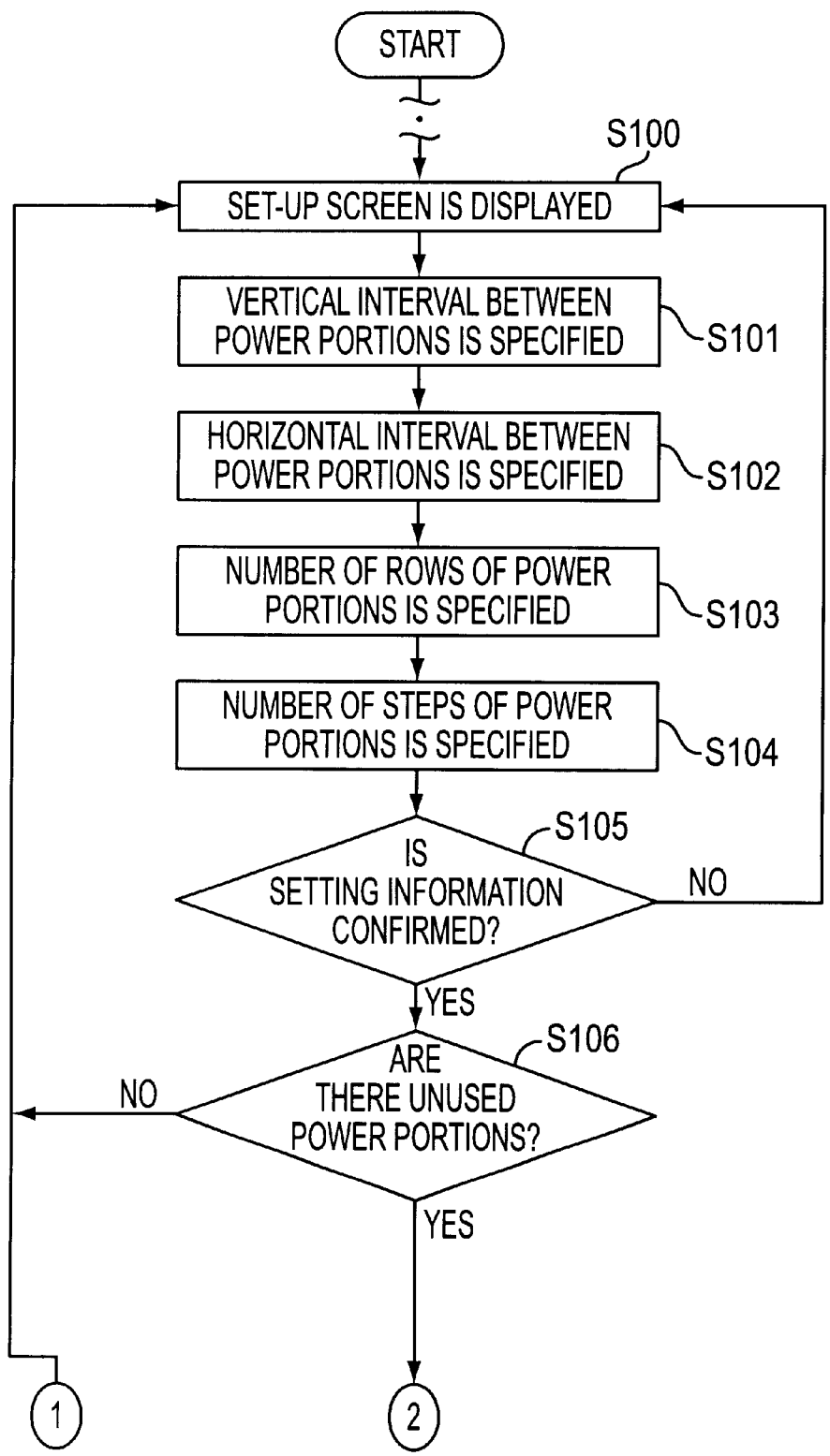
FIG. 5 is a first half of the flowchart of processing implemented according to the present invention.
Figure 6:
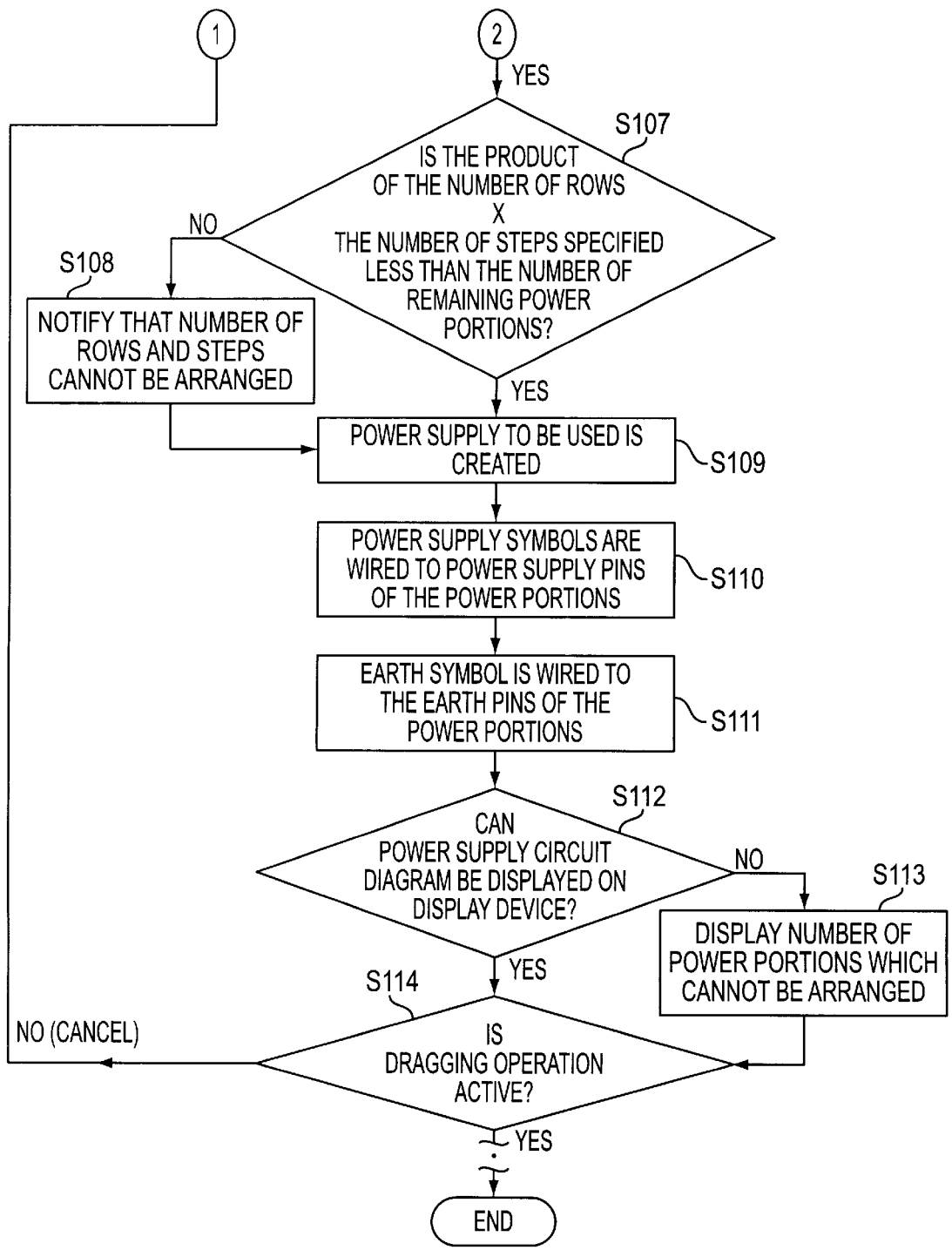
FIG. 6 is second half of the flowchart of processing implemented.

FIG. 5 and FIG. 6 are flowcharts of processing implemented when it is indicated at step S11 in FIG. 4 that the power supply circuit diagram to be created involves an arrangement of power portions only.

Figures 18, 19:
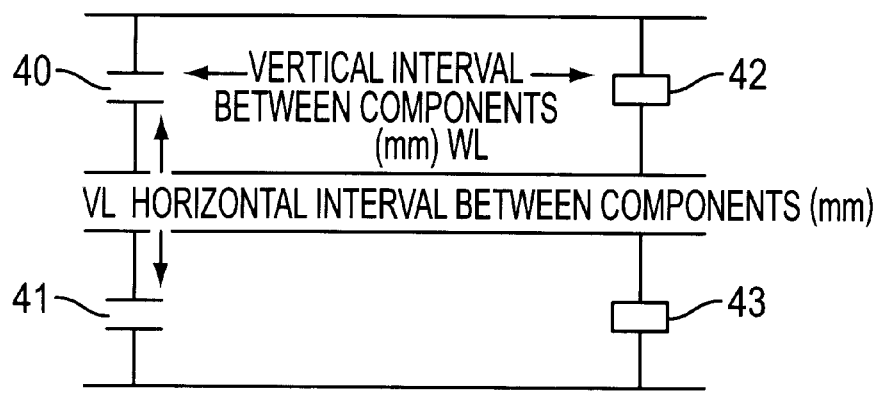
FIG. 18 is a diagram showing an example of a set-up screen.
FIG. 19 is a diagram explaining the vertical and horizontal intervals between the power portions.

In this processing flowchart, firstly, a set-up screen is displayed (step S100). This set-up screen is as shown in FIG. 18, for example, and any one of the four modes described above, modes a, b, c and d, is selected by means of an arrangement method selection button 140 on the set-up screen.

In the case of the processing flowcharts in FIG. 5 and FIG. 6, mode a involving an arrangement of power portions only, is selected. In FIG. 18, the vertical interval between components and the horizontal interval between components are set respectively in the column marked by numerals ① and ②. The power portion data input position 141 displays the number of input power portions, and in the example shown, this is a total of 121. Furthermore, in the example shown, the number of unused power portions is 56.

Here, "input power portions" is used to define power portions already arranged on the circuit diagram screen during the creation of the circuit diagram, where the portions forming circuits principally comprise general portions and power portions. On the other hand, "unused power portions" gives the number of power portions that have not been arranged, in a state where only general portions have been arranged on the circuit diagram screen.

Figure 14:
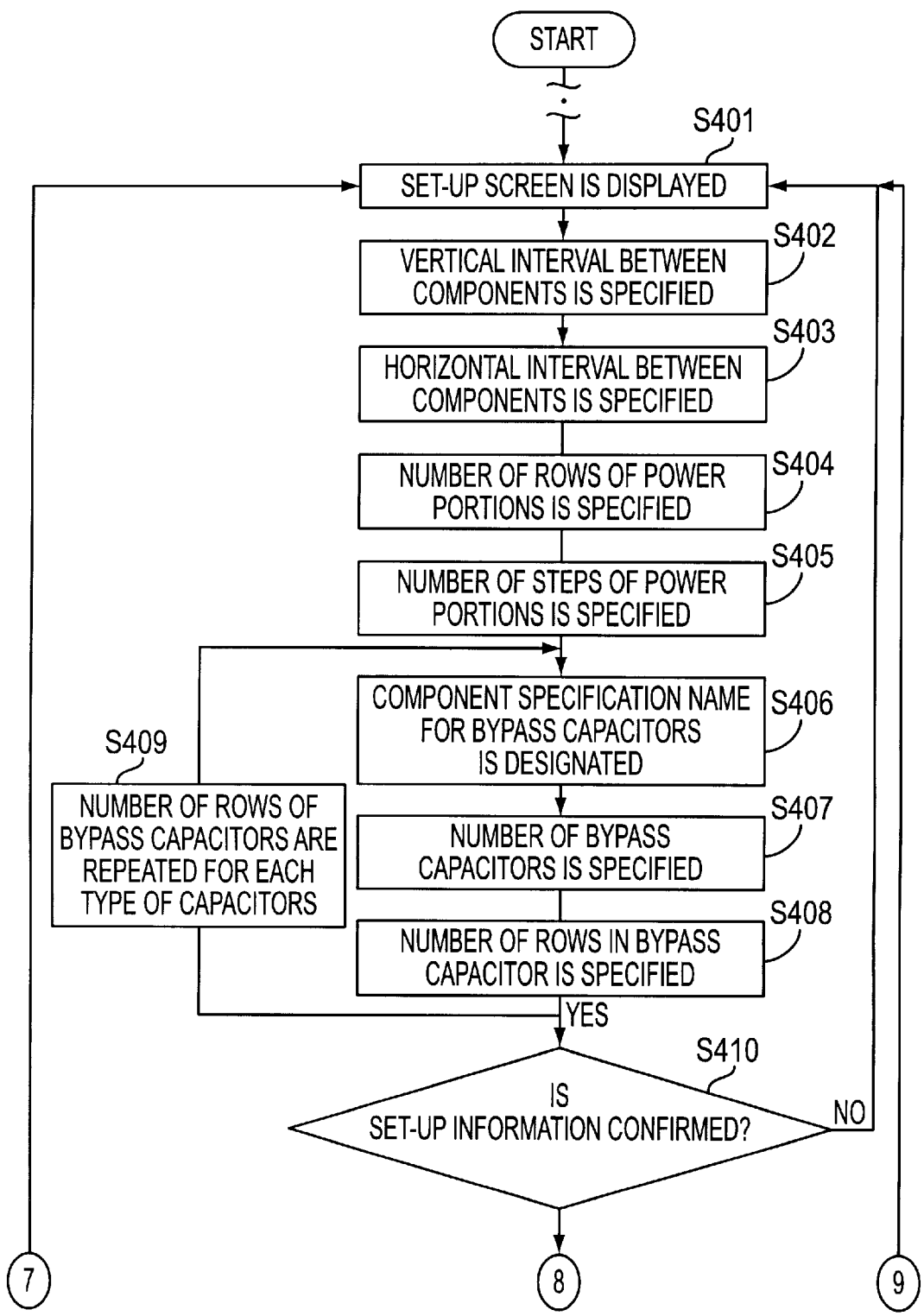
FIG. 14 is a first part of an operational flowchart for power supply circuits generated by arranging power portions and bypass capacitors in a vertical manner.

Furthermore, in FIG. 14, figures indicating the number of rows and the number of steps in which the components are to be arranged are input in the positions marked by ③ and ④. The values input here can be raised or lowered automatically by clicking on the triangular marks. Therefore, it is possible to confirm the desired values at this stage.

The bypass capacitor column 142 displays the total number of arranged capacitors, which is 70 in the example shown in FIG. 18. Columns for inputting component specifications (SPEC), assignment codes (ASSIGN CODE), and the total number of arranged capacitors (NUMBER), etc. are also displayed.

As shown jointly by numeral ⑤ in the diagram, the input columns for assignment codes and the total number of arranged capacitors are provided with triangle symbols used to shift values up or down. Numeral ⑥ in FIG. 18 is an input column, and when creating a bypass capacitor circuit, the supply voltage of the power supply symbols used is input in this column.

Returning to FIG. 5, the vertical interval between power portions is specified (step S101), and the horizontal interval between power portions is specified similarly, using a set-up screen as illustrated in FIG. 18.

The vertical and horizontal intervals between the power portions are specified on the basis of the relationship shown in FIG. 19. In FIG. 19, when components 40 to 43, for example, including power portions, are arranged, the horizontal component interval WL is the interval between the right-hand edge of component 40 and the left-hand edge of component 42, and the vertical component interval VL is the distance between the lower edge of component 40 and the upper edge of component 41.

Moreover, in FIG. 5, the number of rows (step S103), and the number of steps (step S104) of power portions are specified, respectively.

When the vertical and horizontal intervals between the power portions and number of rows and steps of power portions have been specified and input on the set-up screen in this way, button 143 on the set-up display screen shown in FIG. 18 is pressed to confirm the settings (step S105). It is then determined whether or not there exist unused power portions (step S106). As described previously, here "unused power portions" refers to power portions in a situation where only general portions have been arranged on the circuit diagram screen.

As shown in FIG. 6, after step S106, it is determined whether or not the product of the number of rows and the number of steps specified is less than the number of remaining power portions (step S107). If the product of the specified number of rows and steps is greater than the number of remaining power portions, then an arrangement is not possible. Therefore, the designer is informed that the specified number of rows and steps cannot be arranged(step S108).

If the product of the specified number of rows and steps is less than or equal to the number of steps of power portions, then after the designer has been informed that this number cannot be arranged (step S108), the power supply to be used is created (step S109). If there are plural types of power supply pins connected to the component power supply pins, then a corresponding number of different power supply symbols are created.

Here, "creating a power supply" refers to a step in the process of generating a power supply circuit diagram whereby shape data for power supply and earth symbols is read out from the symbol shape library 20 shown in FIG. 1, and power supply and earth symbols are displayed on a display device, which is omitted from the drawings. The voltage of the connected power supply symbols is set automatically by reading the voltage required to drive the power portions (components) from the component library.

Thereupon, the power supply symbols are wired to the power supply pins of the power portions (step S110), and the earth symbol is wired to the earth pins of the power portions (step S111).

Figure 20:
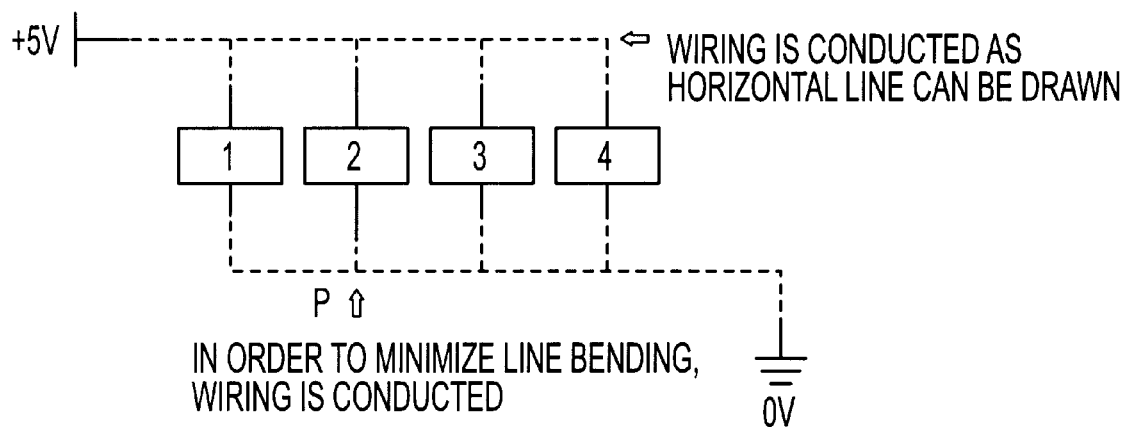
FIG. 20 is a diagram explaining power portions connected to power supply symbols and earth symbols.

The length of the wiring is automatically adjusted. In other words, in order to minimize line bending, wiring is conducted with reference to the longest component pin length in each arranged step of components. This is illustrated in FIG. 20. In FIG. 20, power portions 1, 2, 3, 4 are arranged in a prescribed configuration of 4 rows×1 step. Power portion 2 has the largest pin length. Therefore, in the case of FIG. 20, in order to minimize line bending, wiring is conducted automatically with reference to the pin length of power portion 2, such that horizontal lines can be drawn to +5V and the earth 0V.

In this way, a power supply circuit diagram is generated by arranging power portions with respect to a specified number of rows and number of steps, and wiring these to power supply symbols and earth symbols. This diagram is displayed on a display device, which is omitted from the drawings (step S112).

Figure 21:
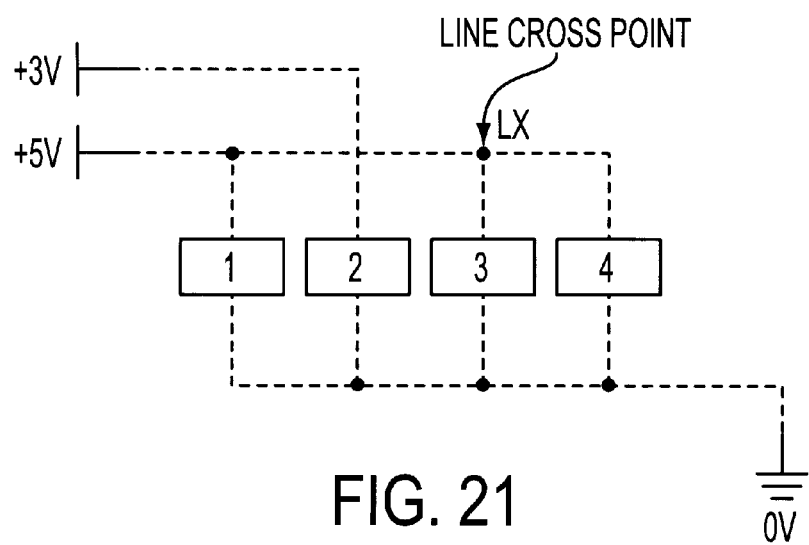
FIG. 21 is a diagram explaining an example where a plurality of power supplies are connected.

FIG. 21 illustrates an example where a plurality of power supplies are connected. Specifically, in cases where a plurality of voltages are required for a plurality of power portions, power supply data is produced for each voltage value used. In FIG. 21, a +3V and a +5V power symbol are displayed. The power symbol for the voltage value to which the greatest number of power portions are to be connected is displayed in a lower position.

In FIG. 21, it is supposed that three power portions, 1, 3 and 4 are connected to the +5V power supply, and only power portion 2 is connected to the +3V power supply. Hence, the number of power portions connected to the +5V power supply is the greater.

Accordingly, this power supply is given priority and the +5V power supply symbol is displayed below the +3V power supply symbol. Therefore, when the two power supplies are connected, the connection line between the connecting pins of power portions 1, 3 and 4 and the +5V power supply symbol intersects with the connection line between the connecting pin of power portion 2 and the +3V power supply symbol. In this case, a crossover mark LX is displayed at connecting cross points, in order to distinguish them from intersections between non-connecting lines.

In FIG. 6, it is also determined whether or not the circuit diagram generated in this way can be arranged within a prescribed screen frame (step S112). If it cannot be arranged within the prescribed screen frame, then the number of power portions which cannot be arranged is displayed to the designer (step S113).

Figure 22:
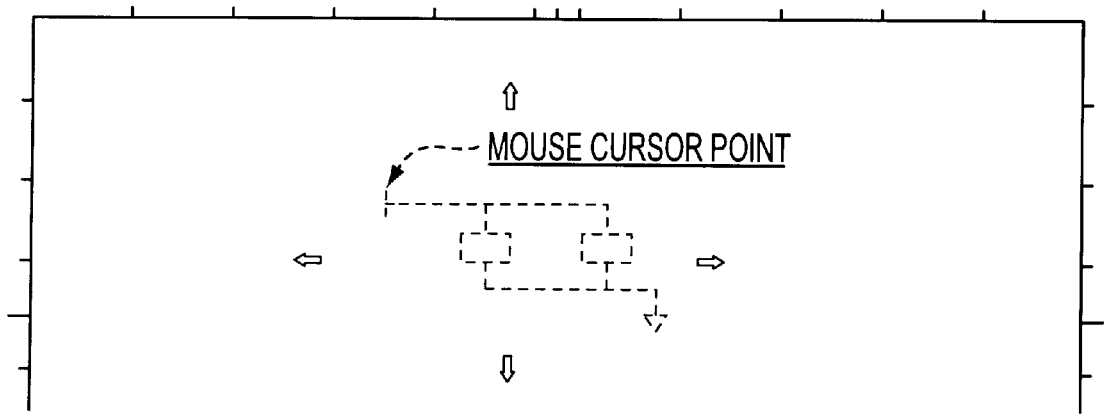
FIG. 22 is a diagram explaining a state in dragging of the power supply circuit diagram.
Figure 23:
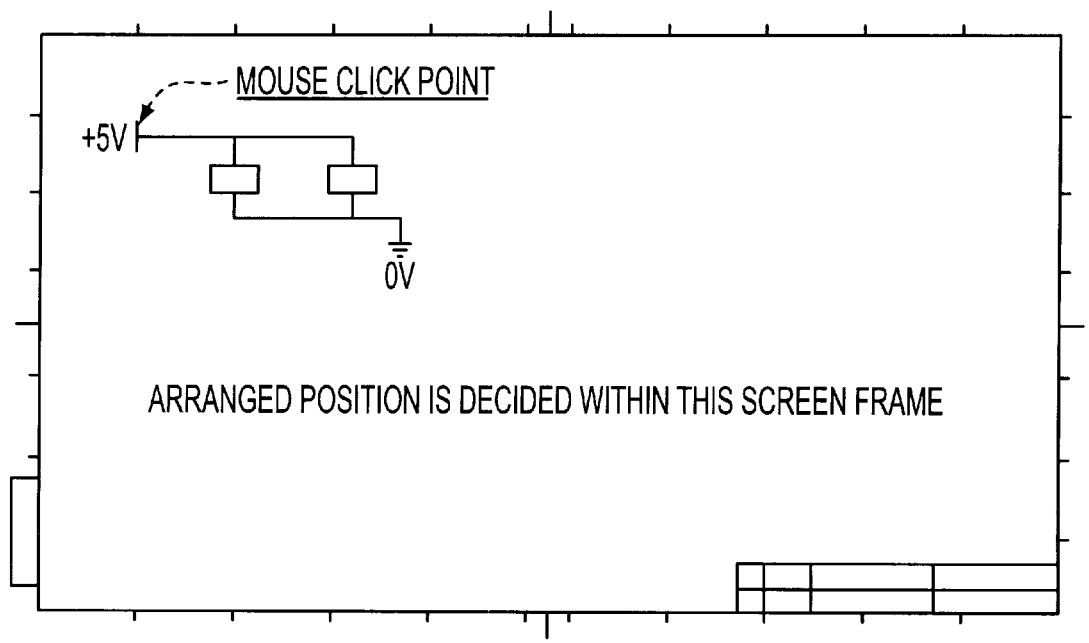
FIG. 23 is a circuit diagram which has been dragged to a set position.
Figure 24:
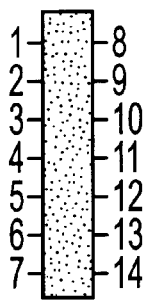
FIG. 24 is a diagram of an example of the IC component.
Figure 25:
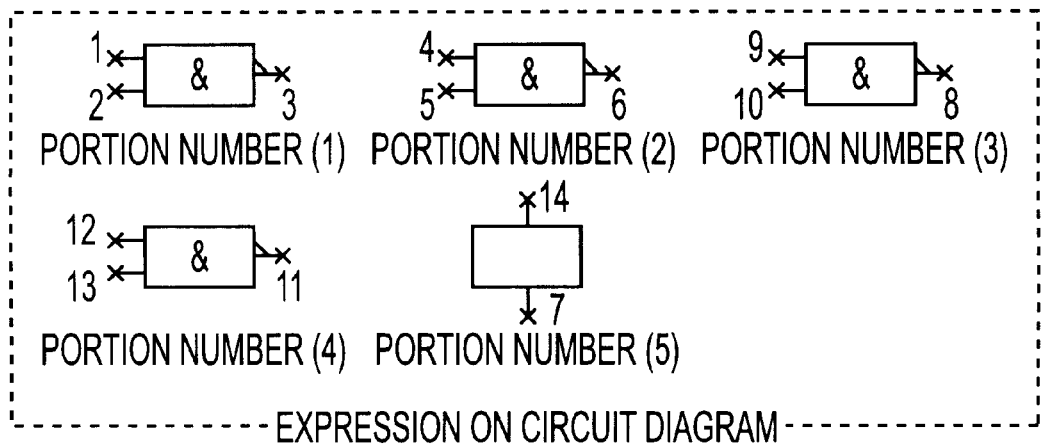
FIG. 25 is a diagram explaining a plurality of power portions for IC components illustrated in FIG. 24.

If the circuit diagram can be arranged within the screen frame, then a "dragging" figure showing the circuit diagram by means of dotted lines or thin lines etc., as shown in FIG. 22, is displayed, and it can be dragged using the mouse to a desired position within the screen frame, thereby setting its position. FIG. 23 shows an example of a circuit diagram which has been dragged to a set position. If the dragging operation is cancelled, then the processing returns to step S100.

In other words, in FIG. 22, a dragging figure of the power supply circuit diagram is shown, and the power supply circuit diagram created can be moved to a desired position within the screen frame by moving the dragging figure displayed up and down or left and right, as indicated by the arrows, by corresponding movement of a mouse, which is omitted from the drawing. For example, FIG. 22 shows a dragging figure in a case where 2 rows and 1 step of power portions are specified, and the figure can be moved within the screen frame whilst this configuration is maintained.

FIG. 23 is a power supply wiring diagram displayed when the dragging figure in FIG. 22 has been moved to a prescribed position within the screen frame, and this position has been confirmed by clicking the mouse confirm button.

Figure 7:
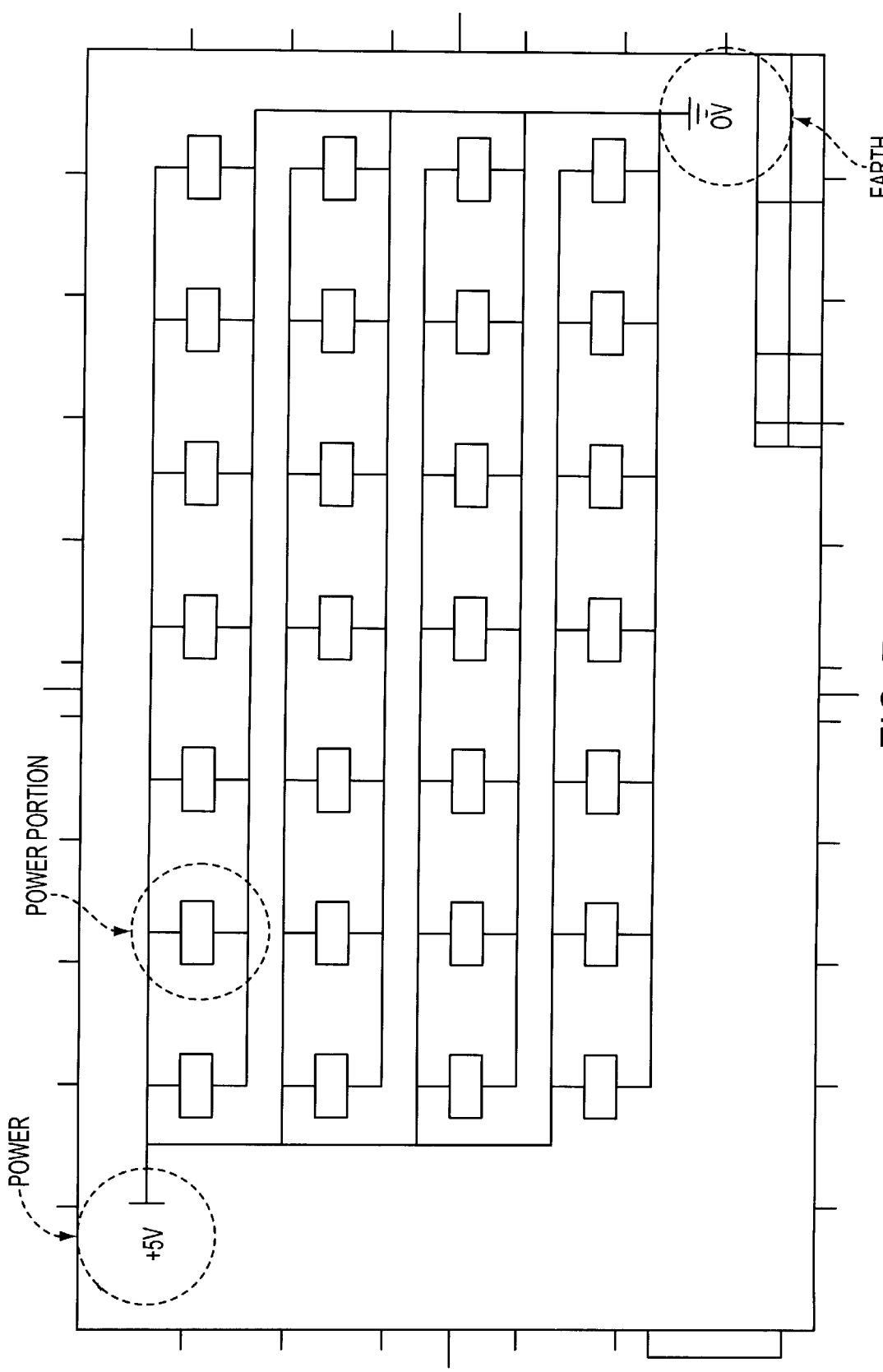
FIG. 7 is a diagram of an example of a power of supply circuit diagram confirmed and displayed on a display screen.

FIG. 7 shows an example of a power supply circuit diagram confirmed and displayed on a display screen, wherein wiring connections have been made between a 7-row, 4-step arrangement of power portions and a +5V power supply and an earth, in accordance with the power portion design.

FIG. 8 shows a diagram which relates commonly to all of the modes of implementation below, and it illustrates a shape sample diagram used in the power supply circuit diagram confirmed and displayed in FIG. 7. The shape and corresponding description are evident from the diagram, and therefore they are not described in detail here.

Figure 9:
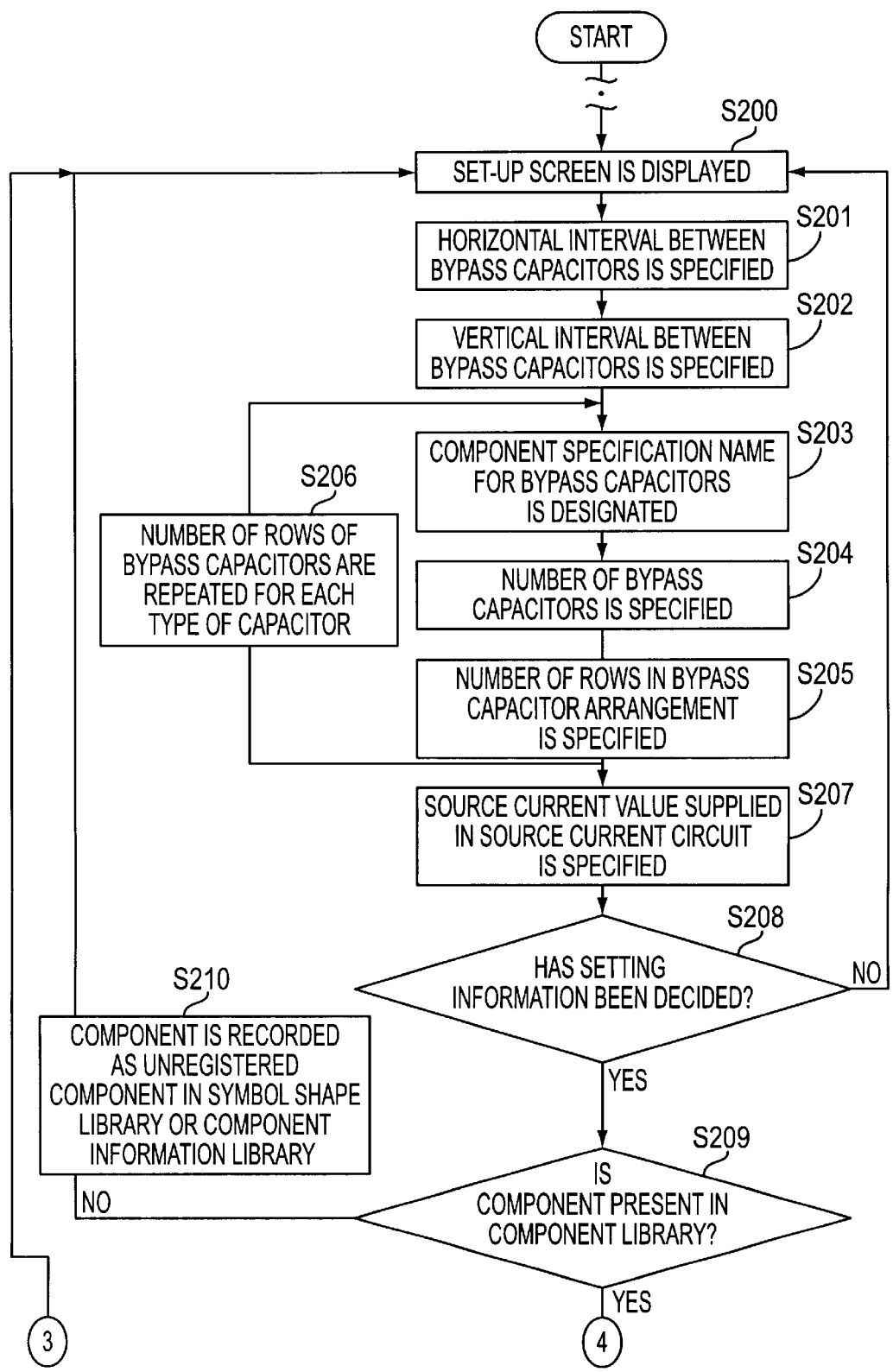
FIG. 9 is a first half of the flowchart of processing conducted wherein bypass capacitors only are arranged.
Figure 10:
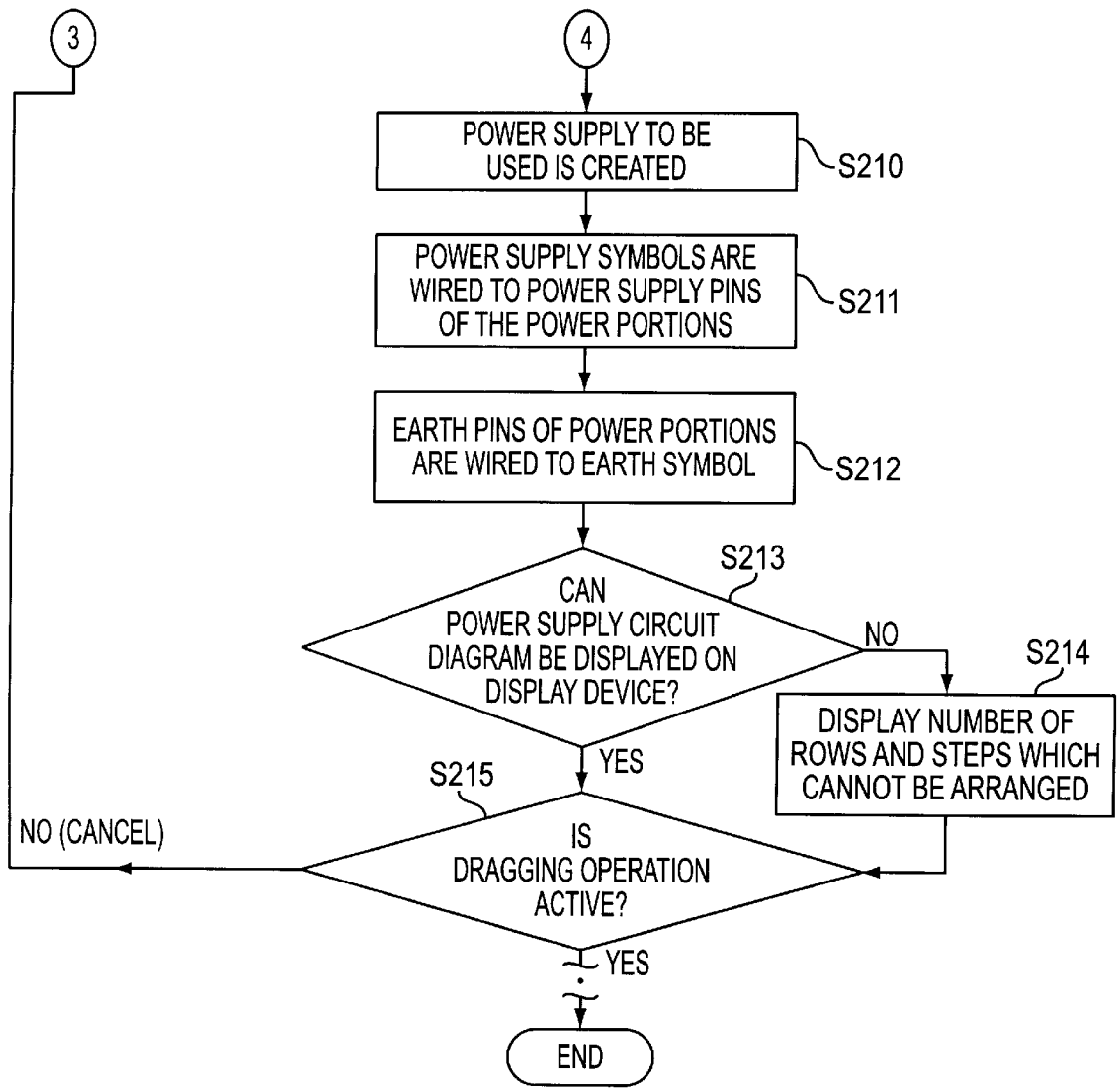
FIG. 10 is a second half of the flowchart of processing conducted wherein bypass capacitors only are arranged.

FIG. 9 and FIG. 10 are flowcharts of processing conducted in a further embodiment, wherein bypass capacitors only are arranged. Similarly to the processing conducted when power portions only are arranged, as described previously with respect to FIG. 5 and FIG. 6, firstly, the set-up screen in FIG. 18 is displayed (step S200). Accordingly, as shown in FIG. 19, the horizontal interval and the vertical interval between the components, in this case, the horizontal interval and vertical interval between the bypass capacitors, are specified, respectively (step S201, step S202). The component specification name for the bypass capacitors is also designated (step S203). This bypass capacitor specification name is input in the column marked by numeral ⑤ in the set-up screen shown in FIG. 18.

The number of bypass capacitors is then specified (step S204). At the same time, the number of rows in the bypass capacitor arrangement is also specified (step S205). Looking at the differences in the processing flowcharts in FIG. 5 and FIG. 6, since one power portion is always required for each IC component, and the number of IC components used in the circuit generating section is already decided, the corresponding number of power portions can also be determined automatically. Therefore, in FIG. 5 and FIG. 6, it is not necessary to input the number of power portions in the set-up display screen in FIG. 18. However, the number of steps and rows in the power portion arrangement must be entered.

On the other hand, in the case of bypass capacitors, 1 bypass capacitor is not always used for each IC component, and in some cases, a plurality of bypass capacitors is used. Therefore, in the processing in FIG. 9, the number of bypass capacitors is specified (step S204). By entering the number of rows of bypass capacitors, the number of steps is set automatically by reference to the input number of bypass capacitors (step S205).

In other words, since the number of bypass capacitors is specified, then if the number of rows of bypass capacitors is input, the number of steps can be determined automatically by division. These processes of indicating the specification name for the bypass capacitors, specifying the number of bypass capacitors, and specifying the number of rows of bypass capacitors are repeated for each type of capacitor (step S206).

When the aforementioned input processes have been completed, and the set-up information has been decided (step S208), it is determined whether or not the component is present in the component library (step S209). This is determined by accessing the symbol shape library 21 and the component information library 22 and searching for the specified component. If it is not present in the library, it is recorded as an unregistered component in the symbol shape library or component information library, and the processing then returns to the set-up screen display (step S210).

When step S209 has been completed, the processing continues on to the flowchart in FIG. 10. The processing in steps S210 to S215 in FIG. 10 corresponds to the processing in steps S109 to S114 illustrated in FIG. 6. Therefore, these processing steps are not described here.

Figure 11:
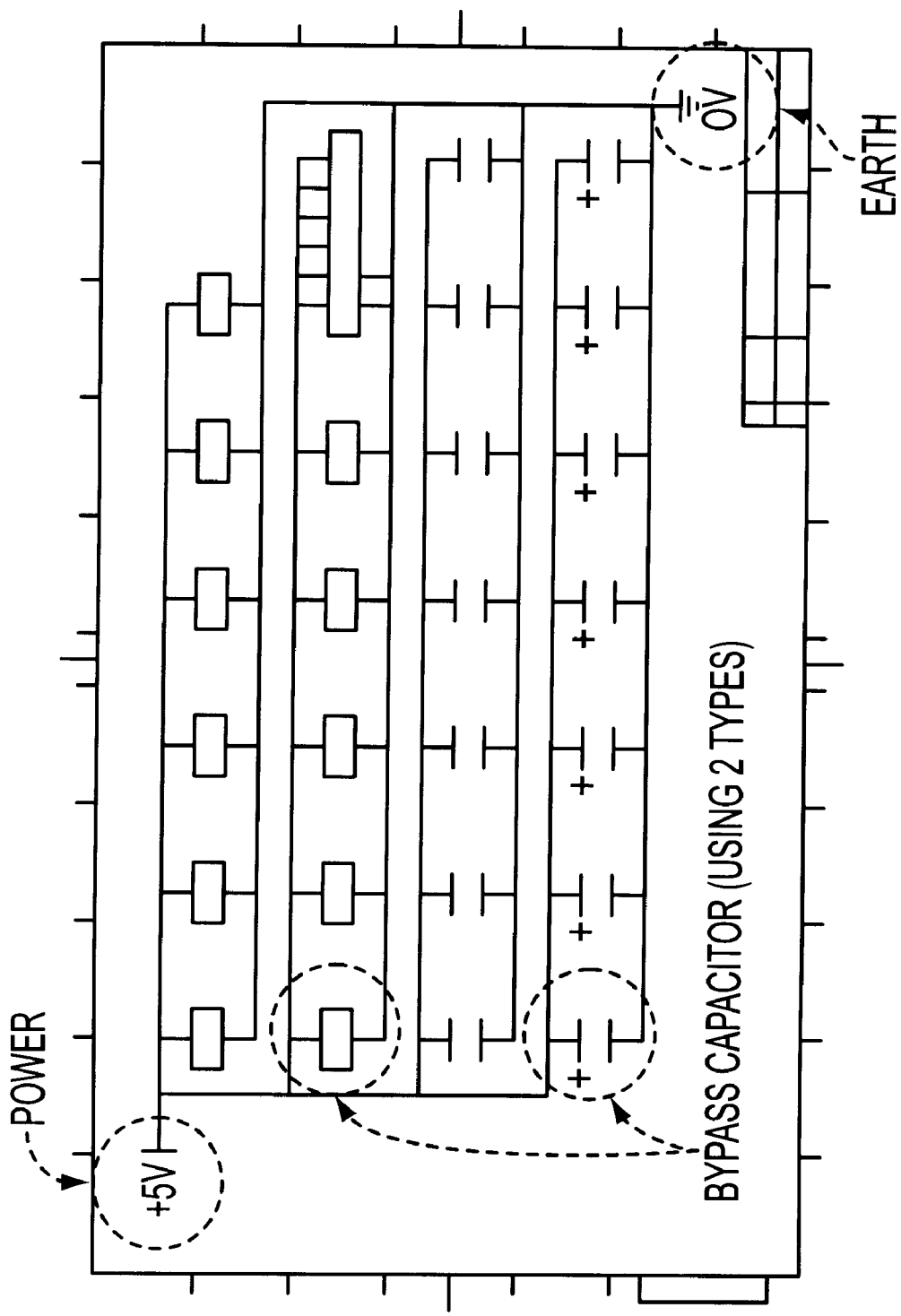
FIG. 11 is a power supply circuit diagram generated by the processing conducted according to the flowchart of FIGS. 9 and 10.

FIG. 11 is a power supply circuit diagram including only bypass capacitors, which is generated by this method. The example shows a 7-row, 4-step configuration. Furthermore, in the example in FIG. 11, two types of bypass capacitors are used: one type is polarized and the other is non-polarized.

Figure 12:
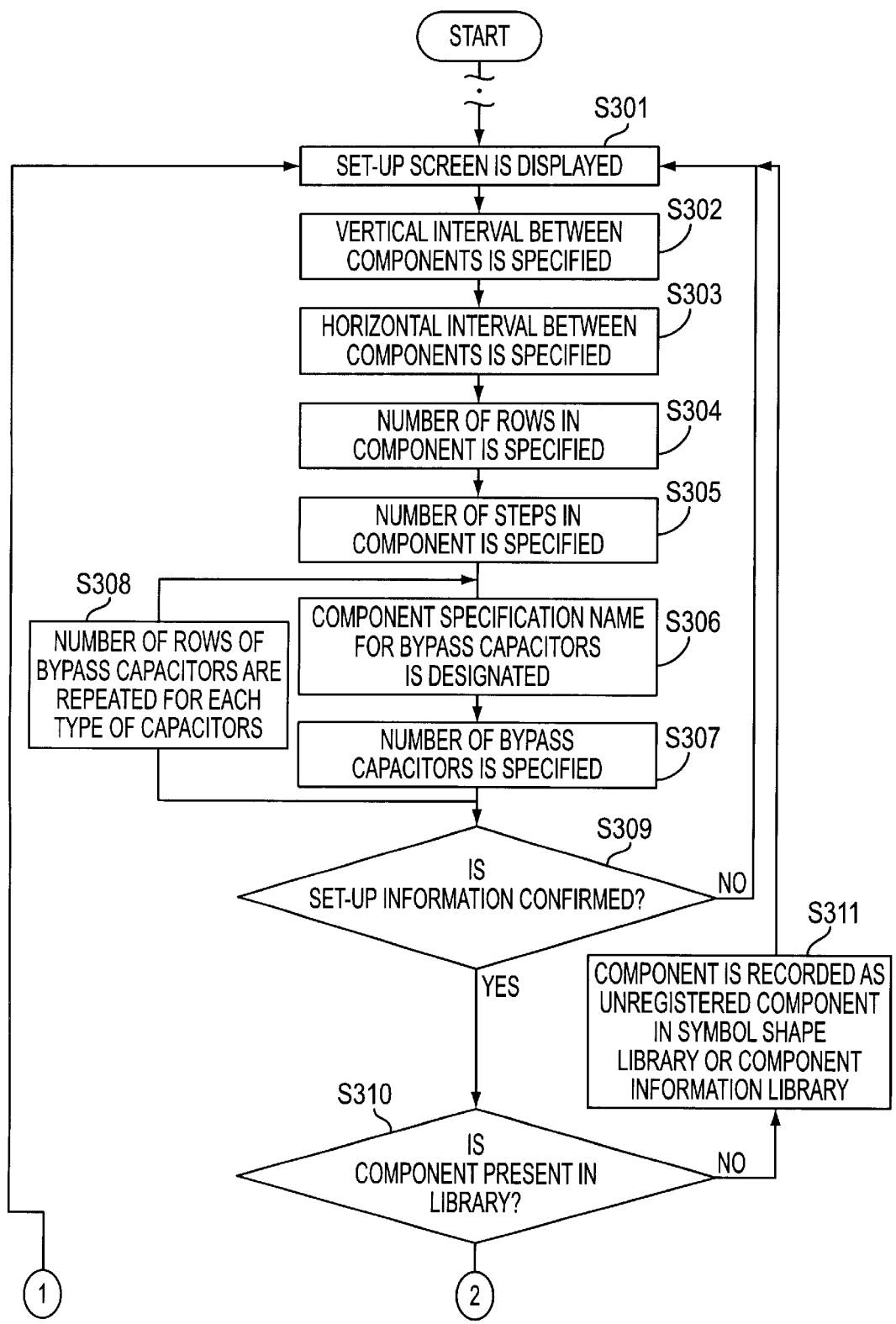
FIG. 12 is a first half of a processing flowchart for generating a power supply circuit wherein power portions and bypass capacitors are arranged alternately.

FIG. 12 shows the first half of a processing flowchart for generating a power supply circuit wherein power portions and bypass capacitors are arranged alternately. The processing in the second half is the same as the flowchart in FIG. 6. Accordingly, numerals ① and ② in FIG. 12 connect to the corresponding positions in the flowchart in FIG. 6.

In FIG. 12, a set-up screen as shown in FIG. 18 is displayed (step S301), similar to the other example. The vertical interval between components is specified on the set-up screen (step S302). The horizontal interval between components (step S303), and the number of rows (step S304) and the number of steps (step S305) in the component arrangement are also specified.

Thereupon, the component specification name for the bypass capacitors is designated (step S306). This designation of the bypass capacitor specification name (step S306) is the same as step S203 in FIG. 9 described previously. The number of bypass capacitors is also specified (step S307). This processing is repeated for each type of capacitor (step S308).

Here, since the number of rows of components and the number of steps of components are already specified (step S304 and step S305), it is not necessary to specify the number of rows for the bypass capacitors again. When this input process on the set-up screen is finished, the set-up information is decided (step S309). It is then determined whether or not the component is present in the library (step S310).

If the component is not present in the library, it is identified as an unregistered component in the symbol shape library 20 or component information library 21, similarly to step S210 previously described with reference to FIG. 9 (step S311).

Figure 13:
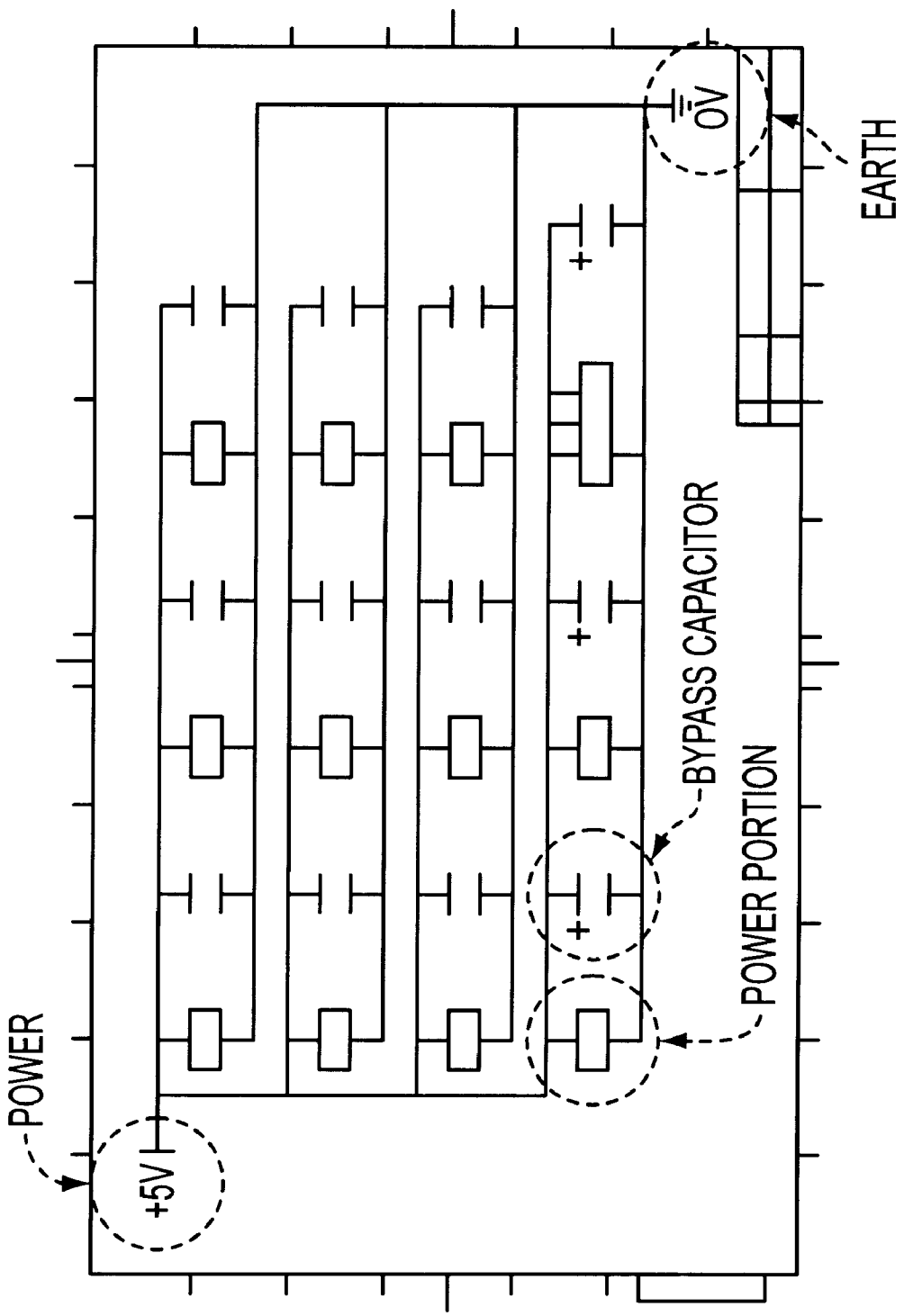
FIG. 13 is an example of a power circuit diagram generated in FIG. 12.

Once it has been determined whether or not the component is present in the component library (step S310), the processing from step S107 in FIG. 6 onwards, as described previously, is followed until processing is completed. FIG. 13 shows an example of a power supply circuit diagram generated by this method, wherein power portions and bypass capacitors are arranged alternately. In other words, it shows an example wherein power portions and bypass capacitors are arranged respectively in alternate rows.

Figure 15:
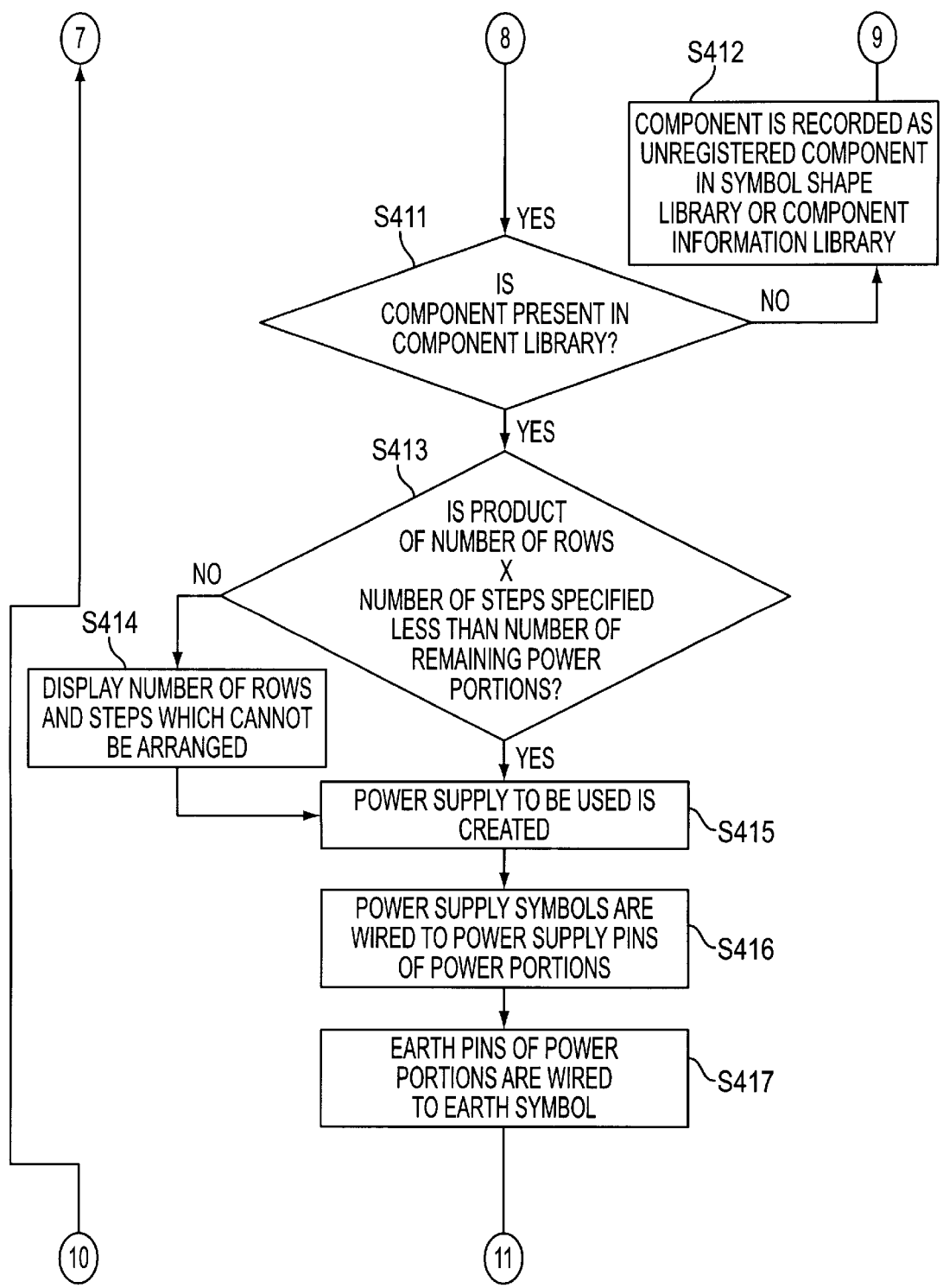
FIG. 15 is a second part of the operational flowchart for power supply circuits generated by arranging power portions and bypass capacitors in a vertical manner.
Figure 16:
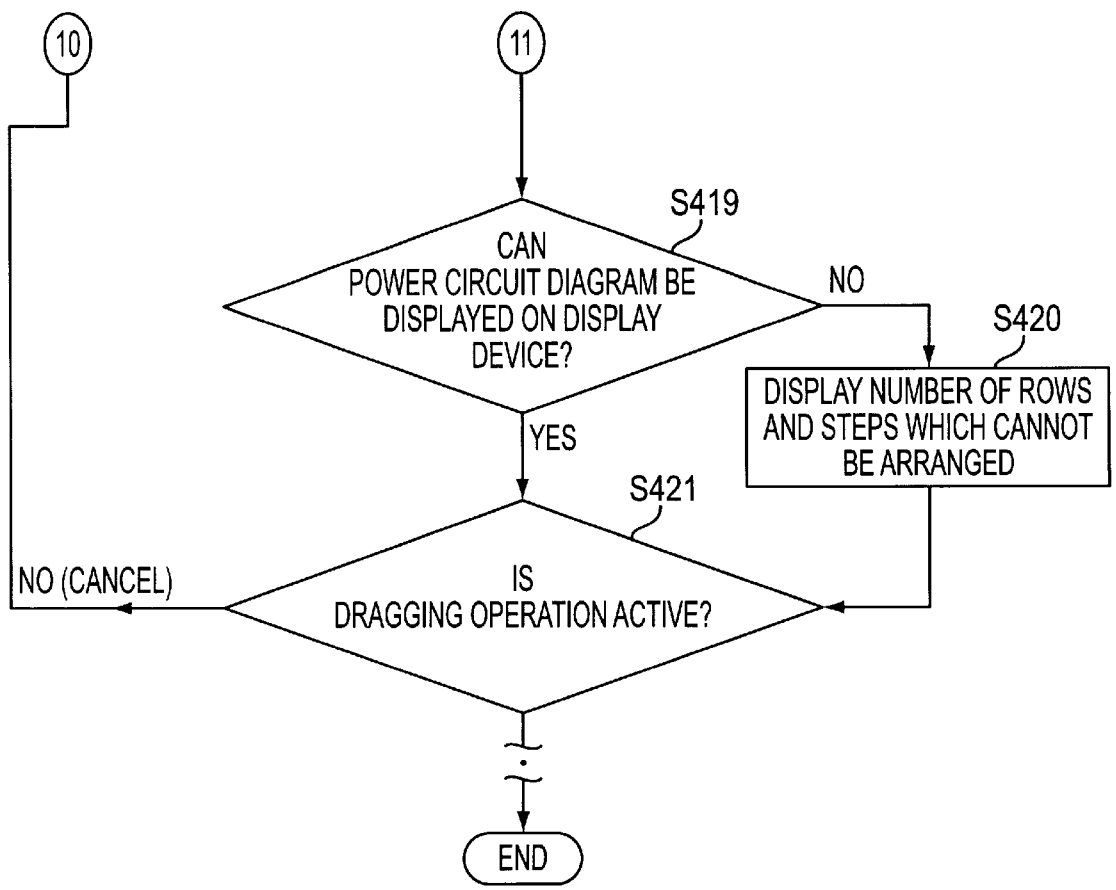
FIG. 16 is a third part of the operational flowchart for power supply circuits generated by arranging power portions and bypass capacitors in a vertical manner.

FIGS. 14 to 16 are operational flowcharts for power supply circuits generated by arranging power portions and bypass capacitors in a vertical manner.

Essentially, these flowcharts represent a combination of the flowcharts in FIG. 5 and FIG. 6 for processing power portions only, and the flowcharts in FIG. 7 and FIG. 8 for processing bypass capacitors only. In other words, as in FIG. 11, the set-up screen shown in FIG. 18 is displayed (step S401), and then the vertical intervals and horizontal intervals between components are specified, respectively (step S402; step S403).

Thereupon, the number of rows of power portions and the number of steps of power portions are specified (step S404, S405). Subsequent processing is similar to that in step S203 and step S206 in FIG. 9, namely, the component specification name for the bypass capacitors, the number of bypass capacitors, and the number of rows of bypass capacitors are specified, respectively (steps S406 to S409).

Here, the set information is confirmed (step S410), and then, in steps S411 and S412 in FIG. 15, which correspond to steps S209 and S210 in FIG. 9, it is determined whether or not the component is present in the library (step S411) and if it is not present, a notification to this effect is issued (step S412).

Thereupon, the processing in steps S413 to S415, corresponding to steps S107 to S109 in FIG. 6, is implemented, and wiring of the power supply symbols to the power supply pins of the power portions (step S416), and wiring of the earth symbols to the earth pins of the power portions (step S417) is carried out. This processing corresponds to steps S110 and S111 in FIG. 6.

With regard to FIG. 16, processing is completed by implementing steps S419 to S421, which correspond to steps S112 to S114 in FIG. 6, whereupon processing is completed.

Figure 17:
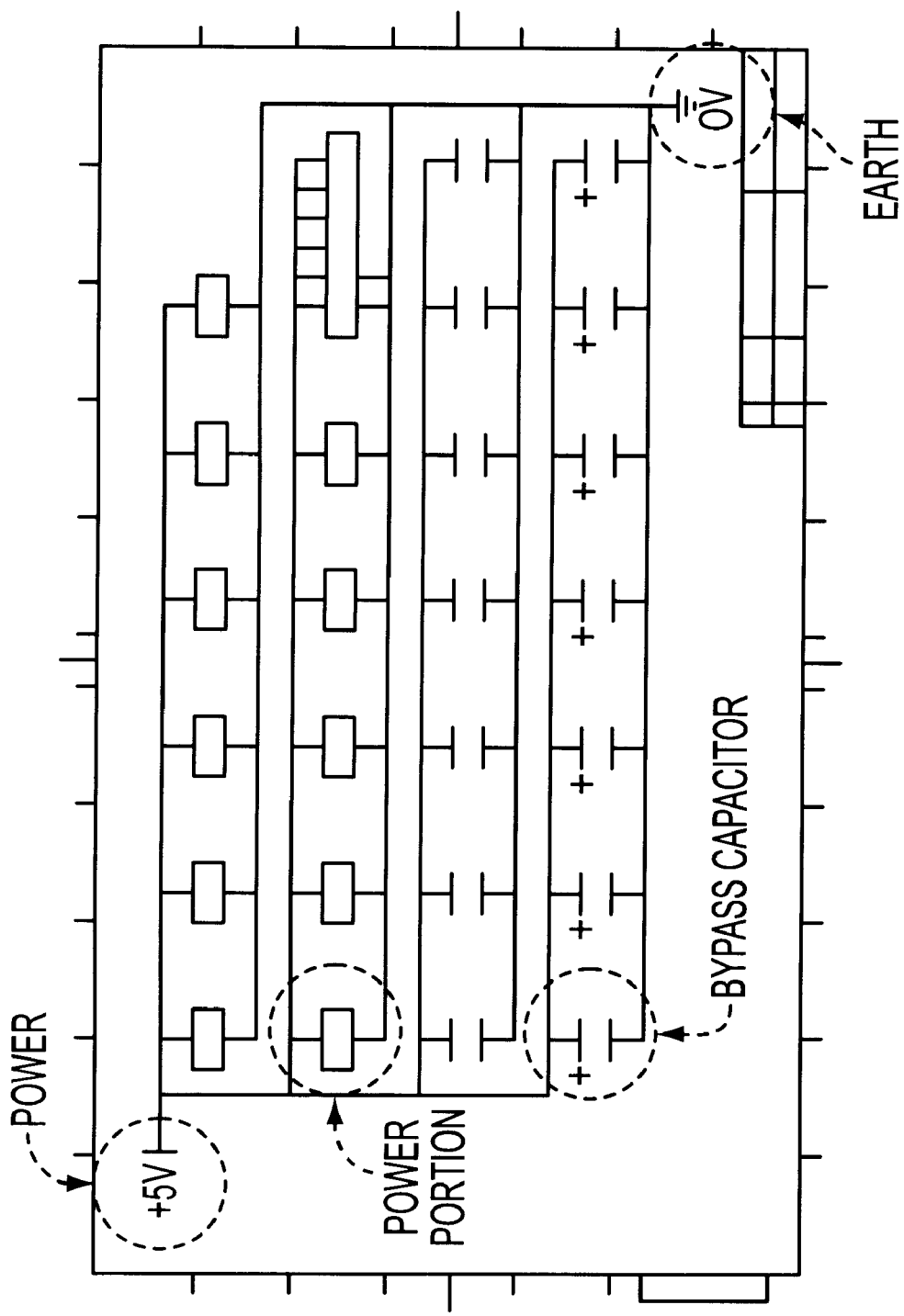
FIG. 17 is a diagram of an example of a power supply circuit diagram generated according to FIGS. 14 to 16.

FIG. 17 shows an example of a power supply circuit diagram generated by this method, wherein power portions and bypass capacitors are arranged in a vertical configuration. In FIG. 17, there are 6 rows×2 steps of power portions in the upper half of the diagram, and 6 rows×2 steps of bypass capacitors in the lower half, each respectively connected to a common power supply and earth.

As described with reference to the aforementioned drawings, according to the present invention, it is possible to create parts of power supply circuit diagrams which have hitherto taken several hours to create in automated power supply circuit diagram design, in several seconds. The present invention can be applied to a wide variety of circuit designs by incorporating numerous variations in the circuit diagram model. Hence, it leads to improved efficiency in design.

Numerous other alternative embodiments of the present invention as explained above may be devised without departure from the spirit and scope of the following claims.

What is claimed is:

1. A power supply circuit diagram design system, comprising:
    a data library;
    a CPU; and
    a memory storing a design aid program implemented by said CPU, which designs power supply circuit diagrams on the basis of said data library in accordance with given conditions for a power supply circuit,
    wherein said given conditions are taken as respective vertical and horizontal intervals of power portions having pins for connecting to a power supply and pins for connecting to an earth, and a number of rows of the power portions and a number of steps of the power portions, and
    wherein a plurality of available power portions are arranged according to said given conditions, and the plurality of arranged power portions are respectively wired to power supply symbols and earth symbols by the design aid program and wiring to said power supply symbols and earth symbols is carried out with reference to the longest pins connecting to the power supply and the earth in the power portions arranged in the number of rows and number of steps according to said given conditions.

2. A power supply circuit diagram design system, comprising:
    a data library;
    a CPU; and
    a memory storing a design aid program implemented by said CPU, which designs power supply circuit diagrams on the basis of said data library in accordance with given conditions for a power supply circuit, wherein said given conditions are taken as vertical and horizontal intervals of bypass capacitors, and a number of bypass capacitors for each type of bypass capacitor and a number of rows for each type of bypass capacitor, and wherein the bypass capacitors are arranged in said number of rows and a number of steps derived from said number of bypass capacitors and said number of rows of bypass capacitors, and bypass capacitors are respectively wired to power supply symbols and earth symbols by the design aid program.

3. A power supply circuit diagram design system, comprising:

a data library;

a CPU; and a memory storing a design aid program implemented by said CPU, which designs power supply circuit diagrams on the basis of said data library in accordance with given conditions for a power supply circuit, wherein said given conditions are taken as respective vertical and horizontal intervals of components including power portions and bypass capacitors having pins for connecting to a power supply and to an earth, a number of rows and a number of steps of said components, and a number of each type of said bypass capacitors, and wherein a plurality of possible power portions and bypass capacitors are arranged alternately according to said given conditions, and the plurality of arranged power portions and bypass capacitors are respectively wired to power supply symbols and earth symbols by the design aid program.

4. The power supply circuit design system according to claim 2, wherein wiring to said power supply symbols and earth symbols is carried out with reference to the longest pins connecting to the power supply and the earth in the bypass capacitors arranged in the number of rows and number of steps according to said given conditions.

5. The power supply circuit design system according to claim 3, wherein wiring to said power supply symbols and earth symbols is carried out with reference to the longest pins connecting to the power supply and the earth in the power portions and bypass capacitors arranged in the number of rows and number of steps according to said given conditions.

6. The power supply circuit design system according to claim 1, wherein, when a number of power portions connected to a power symbol is larger than that of power portions connected to another power symbol said power symbol, is given priority and displayed below the another power symbol.

7. The power supply circuit design system according to claim 2, wherein, when a number of said power supply symbols corresponds to a plurality of potential differences, wiring is carried out by giving priority to said bypass capacitors connected to a power supply symbol of a same type, so that a wiring distance to a corresponding power supply symbol is made as short as possible.

8. The power supply circuit design system according to claim 3, wherein, when a number of said power supply symbols corresponds to a plurality of potential differences, wiring is carried out by giving priority to said power portions and bypass capacitors connected to a power supply symbol of a same type, so that a wiring distance to a corresponding power supply symbol is made as short as possible.

9. The power supply circuit design system according to claim 1, further comprising a display device for displaying the designed power supply circuit, and after the arranged number of rows and number of steps of said power portions has been determined, wiring connections to said power supply and earth are movably displayed on a screen of the display device, as maintaining the form of the connections.

10. The power supply circuit design system according to claim 2, further comprising a display device for displaying the designed power supply circuit, and after the arranged number of rows and number of steps of said bypass capacitors has been determined, wiring connections to said power supply and earth are movably displayed on the screen of the display device, as maintaining the form of the connections.

11. The power supply circuit design system according to claim 3, further comprising a display device for displaying the designed power supply circuit, and after the arranged number of rows and number of steps of said power portions and bypass capacitors has been determined, the wiring connections to said power supply and earth are movably displayed on the screen of the display device, as maintaining the form of the connections.

12. A power supply circuit diagram design method for use in a circuit diagram design system including a data library, a CPU and a memory storing a design aid program implemented by said CPU, which designs power supply circuit diagrams on the basis of said data library in accordance with given conditions for a power supply circuit, said method comprising:

taking said given conditions as respective vertical and horizontal intervals of power portions having first pins for connecting to a power supply and second pins for connecting to an earth, and a number of rows of the power portions and a number of steps of the power portions;

arranging a plurality of available power portions according to said given conditions; and wiring the plurality of arranged power portions, respectively to power supply symbols and earth symbols by the design aid program, wherein the step of wiring to said power supply symbols and earth symbols is carried out with reference to the longest pins connecting to the power supply and the earth in the power portions arranged in the number of rows and number of steps according to said given conditions.

13. A power supply circuit diagram design method for use in a circuit diagram design system including a data library, a CPU and a memory storing a design aid program implemented by said CPU, which designs power supply circuit diagrams on the basis of said data library in accordance with given conditions for a power supply circuit, said method comprising:

taking said given conditions as vertical and horizontal intervals of bypass capacitors, and the number of bypass capacitors for each type of bypass capacitor and a number of rows for each type of bypass capacitor;

arranging bypass capacitors in said number of rows and a number of steps derived from said number of bypass capacitors and said number of rows; and wiring the bypass capacitors respectively to power supply symbols and earth symbols by the design aid program.

14. A power supply circuit diagram design method for use in a circuit diagram design system including a data library, a CPU and a memory storing a design aid program implemented by said CPU, which designs power supply circuit diagrams on the basis of said data library in accordance with given conditions for a power supply circuit, said method comprising:

taking said given conditions as respective vertical and horizontal intervals of components including power portions and bypass capacitors having pins for connecting to a power supply and pins for connecting to an earth and bypass capacitors, a number of rows of the components and a number of steps of said components, and a number of each type of said bypass capacitors;

arranging a plurality of available power portions and bypass capacitors alternately according to said given conditions; and wiring the plurality of arranged power portions and bypass capacitors respectively to power supply symbols and earth symbols.

15. The power supply circuit design method according to claim 13, wherein the step of wiring to said power supply symbols and earth symbols is carried out with reference to the longest pins connecting to the power supply and the earth in the power portions arranged in the number of rows and number of steps according to said given conditions.

16. The power supply circuit design method according to claim 14, wherein the step of wiring to said power supply symbols and earth symbols is carried out with reference to the longest pins connecting to the power supply and the earth in the power portions and bypass capacitors arranged in the number of rows and number of steps according to said given conditions.

17. The power supply circuit design method according to claim 12, wherein, when in the step of wiring, the number of power portions connected to a power symbol is larger than that of power portions connected to another power symbol, said power symbol is given priority and displayed below the another power symbol.

18. The power supply circuit design method according to claim 13, wherein, when the number of said power supply symbols corresponds to a plurality of potential differences, the step of wiring is carried out by giving priority to said bypass capacitors connected to a power supply symbol of a same type, so that the wiring distance to a corresponding power supply symbol is made as short as possible.

19. The power supply circuit design method according to claim 14, wherein, when the number of said power supply symbols corresponds to a plurality of potential differences, the step of wiring is carried out by giving priority to said power portions and bypass capacitors connected to a power supply symbol of a same type, so that the wiring distance to a corresponding power supply symbol is made as short as possible.

* * * * *